US00RE48265E

(19) United States
(12) Reissued Patent
Chi

(10) Patent Number: US RE48,265 E
(45) Date of Reissued Patent: Oct. 20, 2020

(54) BUMPER FOR A VEHICLE

(71) Applicant: Razer Auto, Inc., Upland, CA (US)

(72) Inventor: Samuel Chi, Upland, CA (US)

(73) Assignee: Razer Auto, Inc., Upland, CA (US)

(21) Appl. No.: 29/672,463

(22) Filed: Dec. 5, 2018

Related U.S. Patent Documents

Reissue of:
(64) Patent No.: Des. 826,115
Issued: Aug. 21, 2018
Appl. No.: 29/590,944
Filed: Jan. 13, 2017

(51) LOC (12) Cl. ..... 12-16
(52) U.S. Cl.
USPC ..... D12/172
(58) Field of Classification Search
USPC ..... D12/86, 90, 91, 92, 163, 169, 171, 172, D12/196, 216
CPC ..... B60R 19/02; B60R 19/04; B62D 25/00; B62D 25/06; B62D 25/08; B62D 35/00
See application file for complete search history.

(56) References Cited

U.S. PATENT DOCUMENTS

D697,842 S * 1/2014 Harriton ..... D12/167
D722,927 S * 2/2015 Schroeder ..... D12/171
D726,605 S * 4/2015 Schroeder ..... D12/171
D737,181 S * 8/2015 Smith ..... D12/169
D741,233 S * 10/2015 Glover ..... D12/169
D744,384 S * 12/2015 Harriton ..... D12/169
D744,386 S * 12/2015 Harriton ..... D12/169
D744,387 S * 12/2015 Harriton ..... D12/169
D744,388 S * 12/2015 Harriton ..... D12/169
D749,995 S * 2/2016 Azadi ..... D12/163
D760,133 S * 6/2016 Bennett ..... D12/171
D771,537 S * 11/2016 Hare ..... D12/169
D775,013 S * 12/2016 Bennett ..... D12/169
D775,016 S * 12/2016 Reynolds ..... D12/171
D776,582 S * 1/2017 Bennett ..... D12/169
D777,618 S * 1/2017 Setina ..... D12/171
(Continued)

OTHER PUBLICATIONS

Single page excerpt from an online catalog showing vehicle bumpers, wherein this online catalog was publicly available at least as early as Oct. 2015.

(Continued)

*Primary Examiner* — Philip S Hyder
(74) *Attorney, Agent, or Firm* — Eric Kelly

(57) CLAIM

What is claimed is the ornamental design for a bumper for a vehicle, as shown and described.

DESCRIPTION

*This application is an application for reissue of U.S. Design Pat. No. D. 826,115, which issued on Aug. 21, 2018, from U.S. Design application Ser. No. 29/590,944, filed on Jan. 13, 2017, the contents of which are entirely incorporated by reference herein.*

Figure 1:
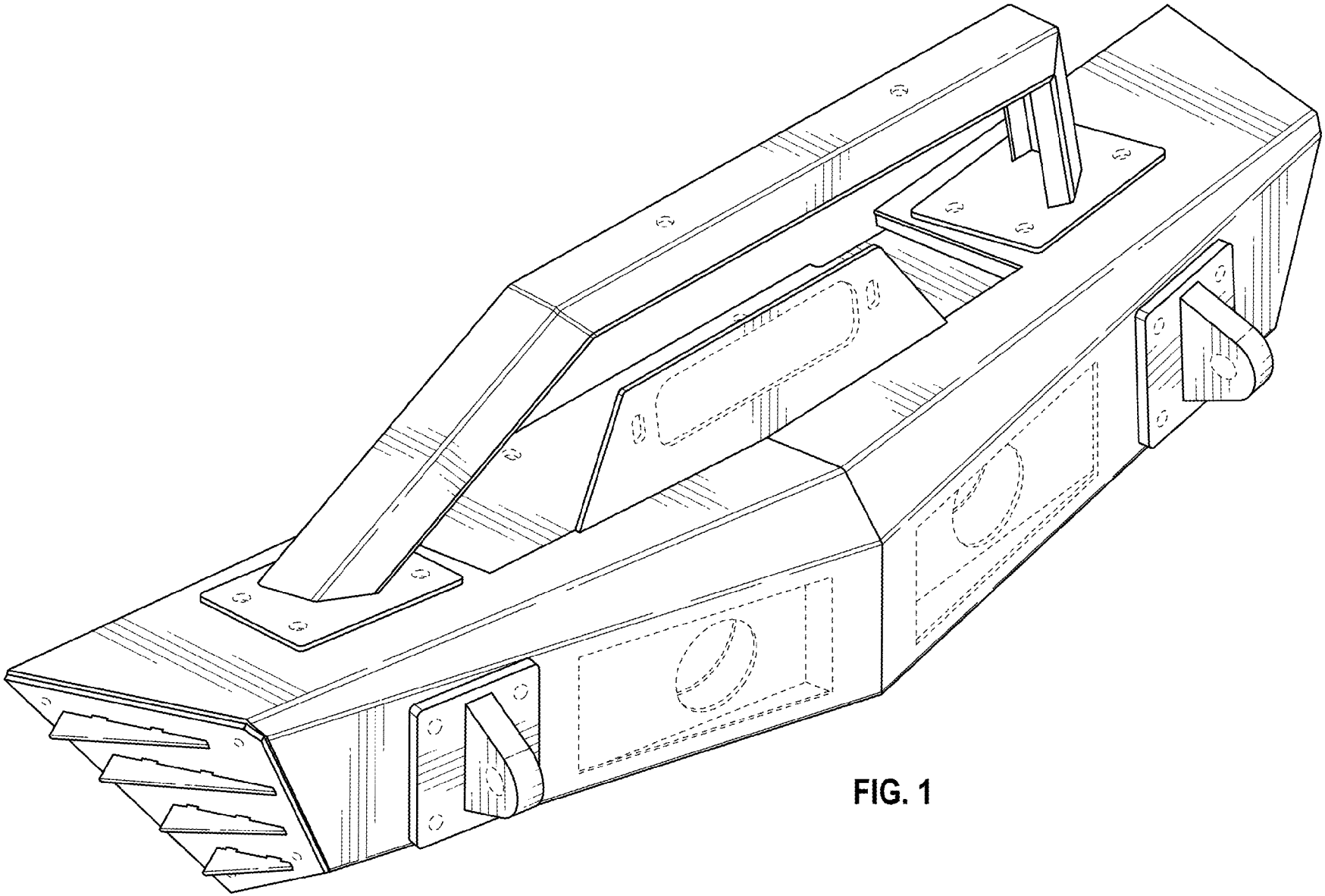
Figure 2:
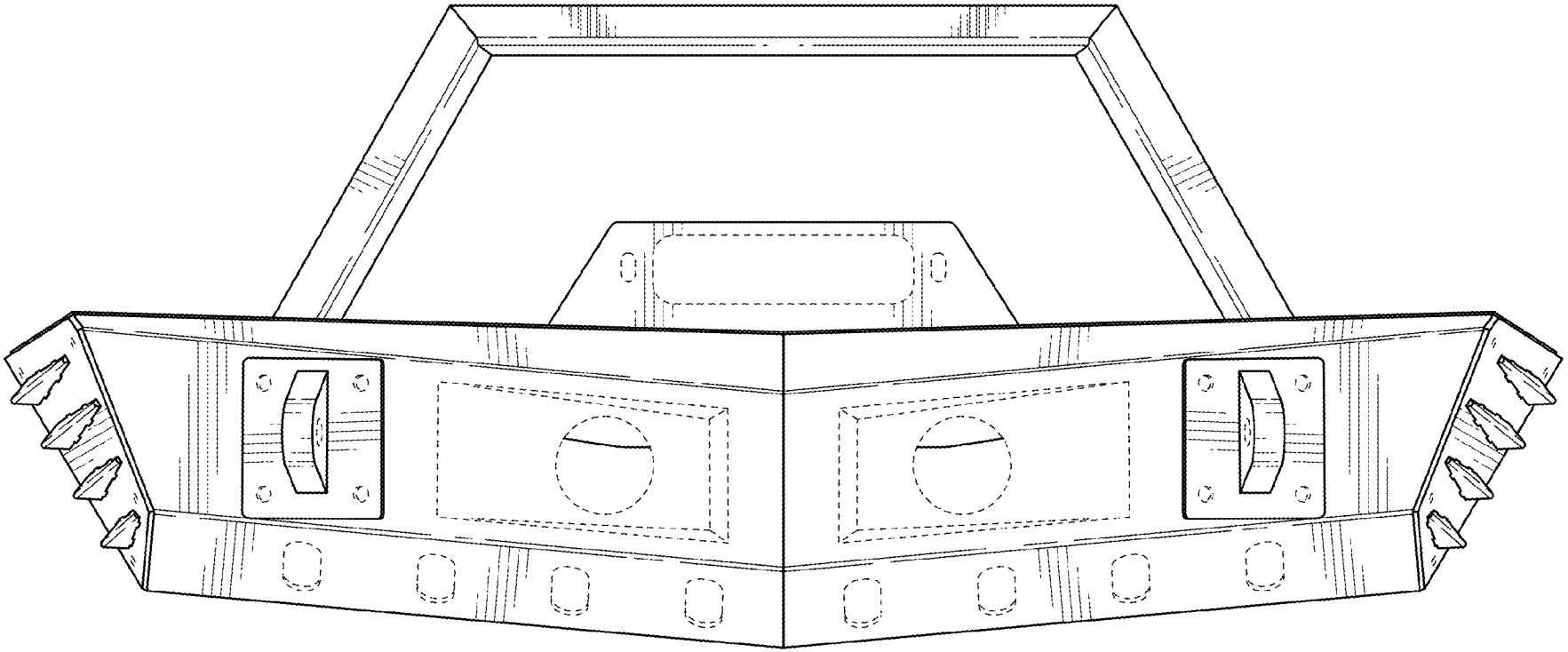
Figure 6:
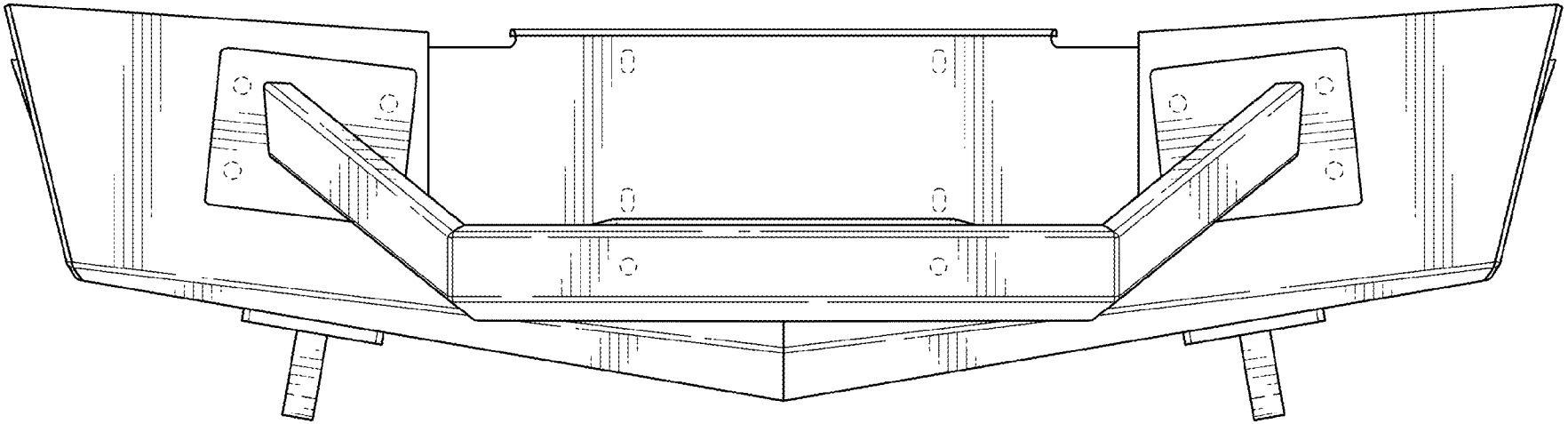

FIG. 1 illustrates a perspective view of a new and ornamental bumper for a vehicle, according to one embodiment;
FIG. 2 illustrates a front view thereof;
FIG. 3 illustrates a back view thereof;
FIG. 4 illustrates a left-side view thereof;
FIG. 5 illustrates a right-side view thereof;
FIG. 6 illustrates a top view thereof; and,
FIG. 7 illustrates a bottom view thereof.
Broken lines in the drawings depict portions of the bumper for a vehicle that form no part of the claimed design.

1 Claim, 6 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D777,619 | S | * | 1/2017 | Barajas | D12/167 |
| D781,193 | S | * | 3/2017 | McMath | D12/196 |
| D785,504 | S | * | 5/2017 | Higgs | D12/91 |
| D792,817 | S | * | 7/2017 | McMath | D12/169 |
| D792,818 | S | * | 7/2017 | McMath | D12/169 |
| D793,304 | S | * | 8/2017 | McMath | D12/169 |
| D794,519 | S | * | 8/2017 | McMath | D12/169 |
| D796,399 | S | * | 9/2017 | Steen | D12/169 |
| D800,036 | S | * | 10/2017 | Bennett | D12/169 |
| D800,226 | S | * | 10/2017 | Zeng | D21/433 |
| D801,892 | S | * | 11/2017 | Drever | D12/171 |
| 2017/0088076 | A1 | * | 3/2017 | Fujimoto | B60R 19/44 |
| 2017/0247014 | A1 | * | 8/2017 | Farooq | B60R 19/12 |
| 2017/0349227 | A1 | * | 12/2017 | Spindler | B62D 65/10 |

OTHER PUBLICATIONS

Photographs of a vehicle bumper (Razer part No. RZKYFB-3309) that was publicly available at least as early as Aug. 9, 2017.
Photographs of a vehicle bumper (Razer part No. RZKYFB-3520) that was publicly available at least as early as Jun. 16, 2016.
Photographs of a vehicle bumper (Razer part No. RZKYFB-3528) that was publicly available at least as early as Oct. 24, 2016.

* cited by examiner

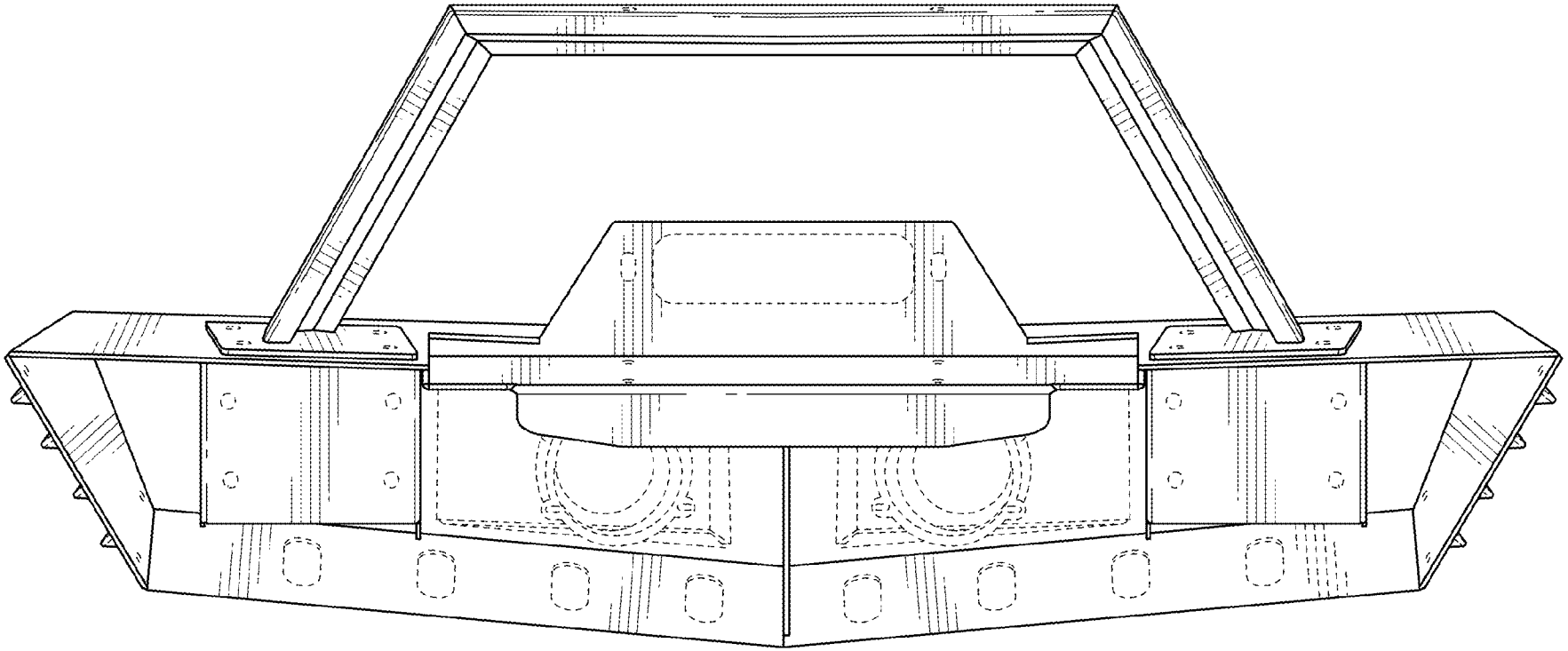
FIG. 3
(Amended)

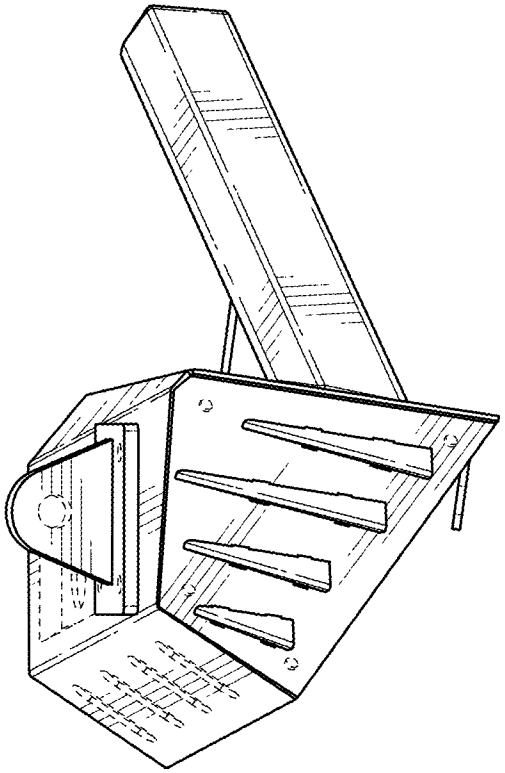
FIG. 5
(Amended)
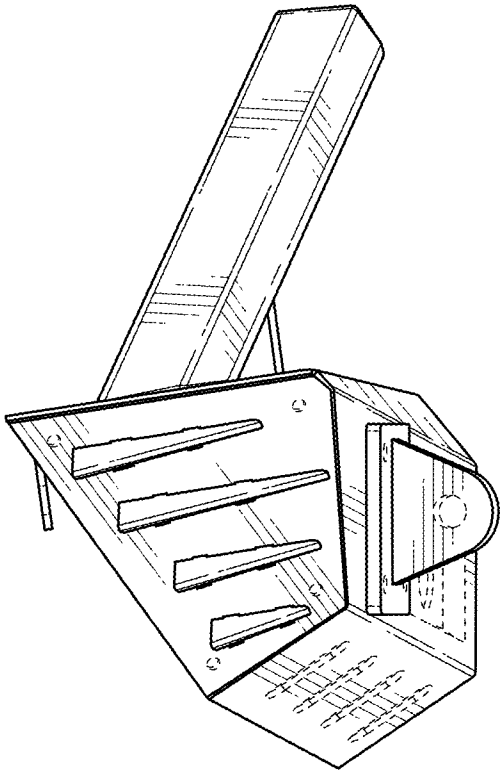
FIG. 4
(Amended)

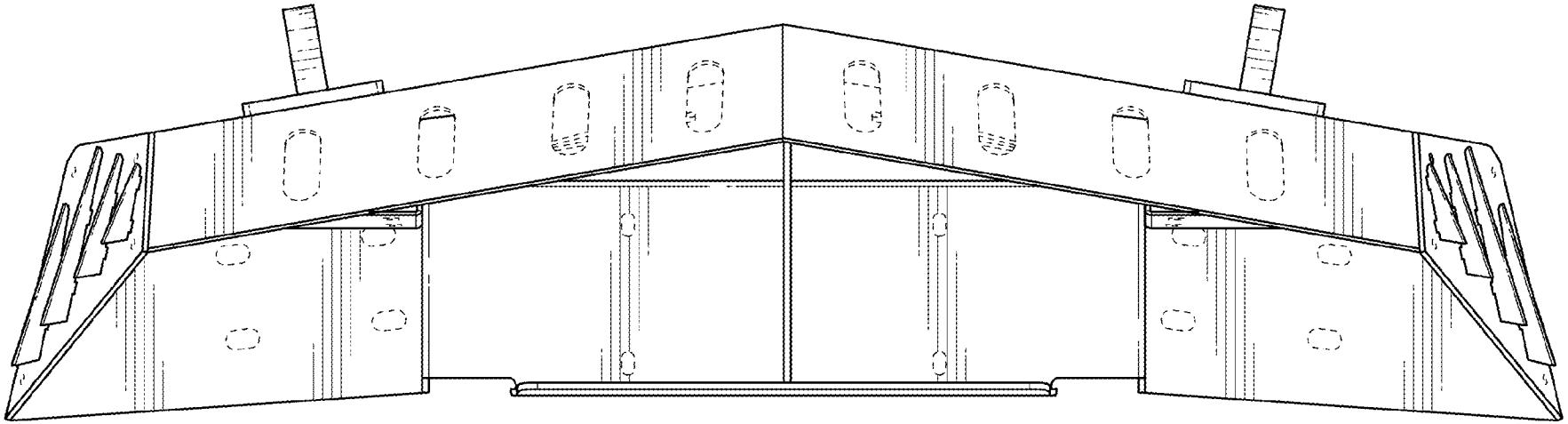
FIG. 7
(Amended)